(No Model.)
B. BEAUPRE.
ROLLER BEARING.
No. 498,737. Patented May 30, 1893.
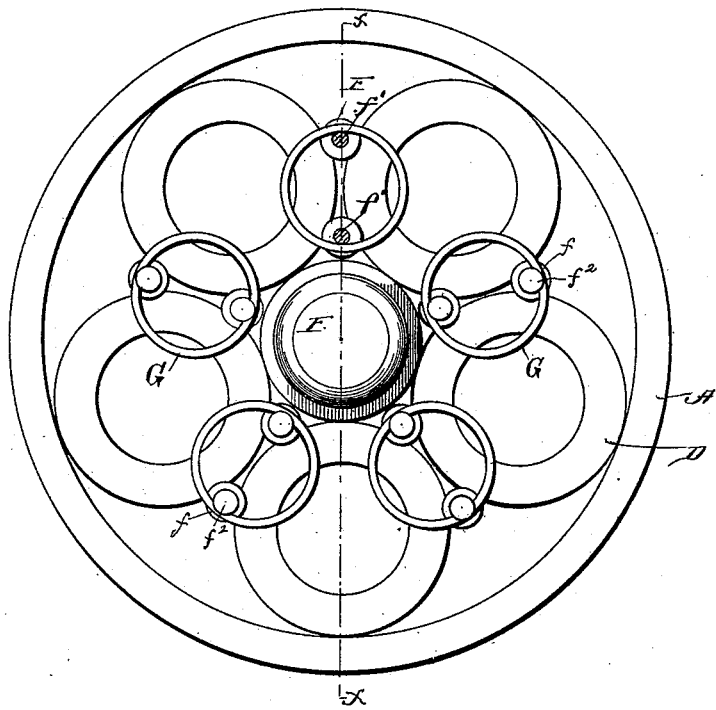
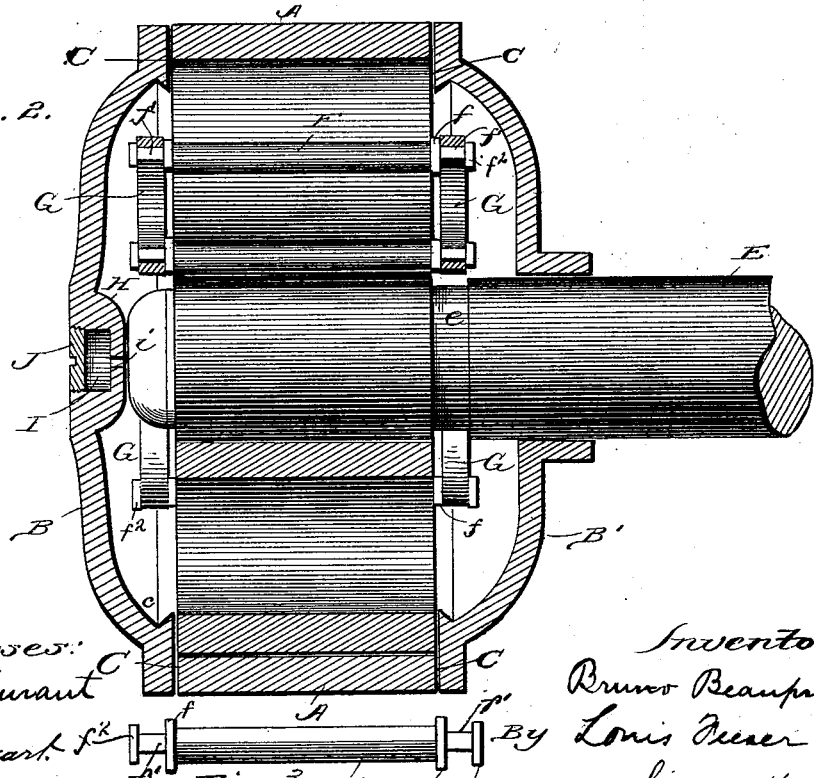
THE NORRIS PETERS CO., PHOTO-LITHO., WASHINGTON, D. C.

UNITED STATES PATENT OFFICE.

BRUNO BEAUPRE, OF ST. PAUL, MINNESOTA.

ROLLER-BEARING.

SPECIFICATION forming part of Letters Patent No. 498,737, dated May 30, 1893.

Application filed October 12, 1892. Serial No. 448,657. (No model.)

*To all whom it may concern:*

Be it known that I, BRUNO BEAUPRE, of St. Paul, in the county of Ramsey and State of Minnesota, have invented certain new and useful Improvements in Antifriction-Bearings; and I do hereby declare the following to be a full, clear, and exact description of the same, reference being had to the accompanying drawings, forming a part of this specification, and to the letters of reference marked thereon.

This invention relates to improvements in anti-friction bearings and particularly to that class employing rollers as the intermediate supporting means, and it has for its object to improve and simplify the construction of the bearing shown in my prior Patent No. 427,539, dated May 13, 1890; to which ends it consists in certain novel details of construction and combinations and arrangements of parts all as will be now described and pointed out particularly in the appended claims.

Referring to the accompanying drawings: Figure 1 is an end elevation of a bearing constructed in accordance with my invention, with the end of the casing or box removed and the outer collars of some of the separating rollers broken away. Fig. 2 is a sectional view on the line $x$—$x$, Fig. 1. Fig. 3 is a detail of one of the separating rollers.

Similar letters of reference in the several figures indicate the same parts.

The box or casing A may be of proper shape to adapt the bearing for any ordinary use, that shown being designed particularly for use on vehicles or cars, being for this purpose provided with end pieces or covers B B', the inner one B' having a central opening for the passage of the axle and both having smooth annular bearing surfaces C in proximity to the inner circumference of the box for preventing longitudinal displacement of the bearing rollers D. These bearing rollers D are of such size and numbers as to practically fill the space between the box A and axle E, forming a rolling support for the latter. Just as in the said former patented structure, I now make use of separating rollers F locating two of them between adjacent rollers on each side of a line drawn through the respective centers of the bearing rollers, and support said separating rollers by means of end supporting rings G.

It will be noted that in the present device the bearing rollers are placed nearer together than in my former patented structure, thus forcing the separating rollers farther apart, and overcoming the tendency of these rollers to work together.

The separating rollers, bearing rollers, and axle are all perfectly smooth throughout their bearing surfaces, affording a long contact, to say nothing of the great convenience of construction and cheapness of such arrangement. Of course provision has to be made to prevent longitudinal movement of the separating rollers, and this I secure by providing each with collars $f$ at each side, projecting beyond the general surface and adapted to strike the ends of the bearings rollers should there be any tendency to move endwise. Outside of the collars $f$ are cylindrical portions $f'$ for the supporting rings, and on the ends smaller collars $f^2$ to hold the rings in place. The axle is recessed or provided with an annular groove $e$ into which the collars $f$ on the separating rollers and the inner portions of the rings may extend, and said axle is held against longitudinal movement by the central bearing H on the outer cover B. The only point where sliding friction occurs is at the end of the axle where it strikes the central bearing, and to supply this bearing with lubricant, the bearing itself is formed with a chamber I having a small duct $i$ for the passage of lubricant to the wearing surface, and a screw or other cover J for closing it from the outside. Inside of the annular bearing surface C the cover has a groove or oil receptacle $c$ for catching the drippings from the bearing H.

The whole bearing, it will be noted, is simple, easily constructed, and, by reason of the long unbroken surfaces of the bearing rollers and other parts, it is well adapted to bear great weight and to allow the axle to revolve with practically no resistance. The simple construction of the ends of the box is such as to hold the whole of the bearing rollers in place even should the axle be withdrawn, yet by the simple act of removing the outer cover the whole is brought into plain view and may be inspected and repaired without difficulty.

Having thus described my invention, what I claim as new is—

1. In a roller bearing, the combination with a series of bearing rollers each having an unbroken circumferential surface, of two separating rollers between adjacent bearing rollers, each having an unbroken circumferential surface and collars at each end adapted to engage the ends of the bearing rollers, and supporting rings passing around the ends of each pair of separating rollers outside of said collars; substantially as described.

2. In a roller bearing, the combination with a box and series of bearing rollers of two separating rollers between adjacent bearing rollers, each having collars outside the bearing rollers adapted to engage the ends of the bearing rollers to prevent longitudinal displacement, and collars at the ends of each separating roller, and supporting rings passing around each pair of separating rollers and lying between the collars on the ends thereof; substantially as described.

3. In a roller bearing the combination with the series of bearing rollers, two separating rollers between adjacent bearing rollers having end collars to prevent longitudinal displacement and supporting rings passing around each pair of separating rollers, of a box having end covers provided with annular bearing surfaces just within the box and adapted to engage the ends of the bearing rollers to prevent longitudinal movement; substantially as described.

4. In a roller bearing, the combination with the series of rollers, axle, and box, of the end cover having the central bearing H provided with a lubricant receptacle, and having the annular bearing just within the box and the annular drip receptacle around the bearing H just within the annular bearing; substantially as described.

In testimony whereof I have hereunto set my hand in presence of two subscribing witnesses.

BRUNO BEAUPRE.

Witnesses:
F. A. ELDREDGE,
LOUIS FEESER, Jr.